Patented Jan. 11, 1944

2,339,058

UNITED STATES PATENT OFFICE 2,339,058

COATING COMPOSITION COMPRISING PARTIALLY POLYMERIZED ALLYL ESTERS CONTAINING POLYMERIZATION INHIBITOR

Gaetano F. D'Alelio, Pittsfield, Mass., assignor to General Electric Company, a corporation of New York No Drawing. Application March 25, 1942, Serial No. 436,151

6 Claims. (Cl. 260—32)

This invention relates to coating compositions and is concerned, more particularly, with coating compositions which are heat-stable and time-stable, that is have long shelf life. These coating compositions comprise a partially polymerized polymer of a diallyl ester of a dicarboxylic acid, the dicarboxylic acid being selected from the class consisting of saturated aliphatic dicarboxylic acids and aryl dicarboxylic acids, and, as a solvent and polymerization inhibitor therefor, an allyl ester of a monocarboxylic acid having the structural formula:

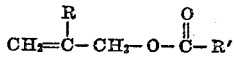

In the above formula R is a member of the class consisting of hydrogen and the methyl radical and R' is an alkyl radical having at least one and no more than five carbon atoms, such as, for example, methyl, ethyl, propyl, isopropyl, butyl, isobutyl, sec.-butyl, tert.-butyl, amyl, isoamyl, sec.-amyl, tert.-amyl.

In my copending application, Serial No. 302,173, filed October 31, 1939, now Patent No. 2,308,495, and assigned to the same assignee as the present invention, I have disclosed and claimed interpolymers of allyl esters such as allyl chloride, allyl acetate, allyl propionate, methallyl acetate, methallyl chloride, methallyl butyrate, etc., with unsaturated alkyd resins, that is an alkyd resin prepared by the esterification of an alpha-unsaturated, alpha, beta-polycarboxylic acid and a polyhydric alcohol.

I have now discovered that when an attempt is made to copolymerize a partially polymerized diallyl ester of a dicarboxylic acid with an allyl or methallyl ester of an aliphatic acid, even in the presence of a polymerization catalyst, neither copolymerization of the ingredients nor polymerization of either one of the constituents occurs over an extended period of time. However, if the mixture of these components is used as a varnish or paint, the allyl ester or the methallyl ester of the lower-aliphatic acid evaporates leaving the partially polymerized diallyl ester behind as a film which can now be further polymerized to the insoluble and infusible state to give a film of exceptional resistance to attack by chemical reagents.

The partially polymerized diallyl esters of dicarboxylic acids are easily prepared. One method comprises polymerizing the diallyl ester in carbon tetrachloride solution whereby a soluble fusible product is obtained which may be precipitated with methanol. The latter product may then be still further polymerized to the insoluble and infusible state. Such a product is more fully disclosed and claimed in a copending application of A. M. Ross, Jr., Serial No. 380,315, filed February 24, 1941, and assigned to the same assignee as the present invention.

Another method comprises polymerizing the diallyl ester in the presence of copper salts removing the copper salts and precipitating the partial polymer with methanol. This product is also soluble and fusible and capable of being further polymerized to the insoluble and infusible state. Such products are more fully described and claimed in the copending application of A. M. Ross, Jr., Serial No. 380,667, filed February 26, 1941, and assigned to the same assignee as the present invention. Although these partial polymers may be dissolved in ordinary solvents to produce useful varnishes, they have one serious drawback in that the partial polymer continues to polymerize on standing at room temperature even in the absence of a polymerization catalyst. This results in the polymer precipitating out of the solvent.

I have now discovered that this disadvantage may be overcome by the use of allyl esters having the structural formula:

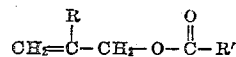

where R and R' have the meanings previously given, as solvents for the partially polymerized diallyl esters of dicarboxylic acids. Not only are these allyl esters of monocarboxylic acids effective solvents for the partial polymers but also act as inhibiting agents for the further polymerization of the partial polymer even in the presence of a polymerization catalyst. It is therefore possible to incorporate a polymerization catalyst into the varnish and yet have a varnish that has a long shelf life, that is the partial polymer will not advance in degree of polymerization to the point where it will precipitate out of the solvent as would be the case if ordinary solvents had been employed. This is a valuable contribution to the art for making such varnishes commercially successful.

In order that those skilled in the art may better understand my invention the following illustrative examples are given. All parts are by weight.

The first two examples illustrate the method used in preparing the partial polymers for use in the varnishes.

Example 1

| | Parts |
|---|---|
| Diallyl phthalate | 50 |
| Carbon tetrachloride | 50 |
| Benzoyl peroxide | 1 |

The above mixture was heated at the boiling temperature of the mass under reflux for 10 hours. On pouring the resulting mass into hot methyl alcohol a soft taffy-like solid separated. After triturating the mass under hot methyl alcohol three times and drying overnight at room temperature, a hard solid capable of being ground was obtained.

Example 2

| | Parts |
|---|---|
| Diallyl phthalate | 100 |
| Benzoyl peroxide | 2 |

The above ingredients were heated together for 8 minutes at 95° C. in the presence of a roll of freshly reduced copper gauze. After removing the copper gauze the temperature was raised to 170° C. to destroy the excess peroxide. Two parts of benzoyl peroxide were added to the mix which was then heated to 100° C. for 30 minutes to cause further polymerization. Mossy zinc was added and heating continued at 100° C. for 15 minutes to remove the copper salts from solution. Filtering the liquid mass removed the excess zinc, precipitated copper and the insoluble zinc salts. A quicker removal of the copper salts and more rapid filtering is obtained by diluting the viscous liquid with a solvent, e. g. ethyl acetate, before addition of the zinc. The partial polymer in the filtered solution was precipitated and triturated with methyl alcohol and dried as described under Example 1 to produce a hard colorless solid which could be ground to a fine powder.

Example 3

| | Parts | | | |
|---|---|---|---|---|
| | A | B | C | D |
| Allyl acetate | 50 | 90 | 50 | 90 |
| Partial polymer of Example 1 | 50 | 10 | | |
| Partial polymer of Example 2 | | | 50 | 10 |
| Benzoyl peroxide | 2 | 2 | 2 | 2 |

The above mixtures were heated at 40° C. for 15 hours after which time the temperature was gradually raised to 100° C. and maintained at the latter temperature for several hours. At the end of the heating period there had been no apparent increase in the viscosity of any of the solutions or separation of a solid phase indicating that no further polymerization of the partial polymer or copolymerizaion of the components had occurred.

Example 4

| | Parts | | | | |
|---|---|---|---|---|---|
| | A | B | C | D | E |
| Methallyl acetate | 50 | 90 | 50 | 90 | 80 |
| Partial polymer of Example 1 | 50 | 10 | | | |
| Partial polymer of Example 2 | | | 50 | 10 | 20 |
| Benzoyl peroxide | 2 | 2 | 2 | 2 | 2 |

The above mixtures were treated as described under Example 3 with identical results.

When solutions of the samples of both Examples 3 and 4 were flowed onto glass plates and baked at 100° C. films were obtained that were hard and clear. They would not soften at 180° C. and were not adversely affected by ordinary solvents such, for example, as acetone, benzene, toluene, alcohol, etc.

It will be understood, of course, by those skilled in the art that my invention is not limited to the production of varnishes of partial polymers of diallyl phthalate dissolved in allyl acetate or methallyl acetate. Instead of using partial polymers of diallyl phthalate I may use other diallyl esters of saturated aliphatic or aryl dicarboxylic acids, illustrative examples of which are:

Diallyl succinate
Diallyl glutarate
Diallyl adipate
Diallyl phthalate
Diallyl isophthalate
Diallyl terephthalate
Diallyl naphthalene-1,2-dicarboxylate
Diallyl naphthalene-1,4-dicarboxylate
Diallyl naphthalene-2,3-dicarboxylate
Diallyl naphthalate
Diallyl oxalate
Diallyl malonate
Diallyl methyl-malonate
Diallyl dimethyl-succinate
Diallyl sebacate
Diallyl pyrotartarate Instead of using allyl acetate or methallyl acetate I may use other allyl or methallyl esters of a saturated aliphatic monocarboxylic acid illustrative examples of which are:

Allyl propionate
Allyl butyrate
Allyl isobutyrate
Allyl valerate
Allyl isovalerate
Methallyl propionate
Methallyl butyrate
Methallyl isobutyrate
Methallyl valerate
Methallyl isovalerate
Allyl methyl-ethyl-acetate
Allyl trimethyl-acetate
Methallyl methyl-ethyl-acetate
Allyl hexanoate
Methallyl hexanoate Also instead of using benzoyl peroxide as a polymerization catalyst in preparing my partial polymers, I may use only heat, light or heat and light with or without the addition of a polymerization catalyst. Additional examples of polymerization catalysts that may be used are: inorganic super-oxides such as barium peroxide, sodium peroxide, etc., aliphatic acyl peroxides, e. g., acetyl peroxide, lauryl peroxide, stearyl peroxide, etc., peroxides of the aromatic or of the aliphatic-aromatic acid series, e. g., benzoyl peroxide, acetyl benzoyl peroxide, etc. Benzoyl peroxide is the preferred catalyst. Any suitable amount of catalyst may be used, but in general the catalyst concentration will be in the range of 0.1 to 6.0 per cent by weight of the whole. Polymerization of the diallyl esters to form the partial polymer or of the partial polymer to the final or insoluble, infusible form may be effected at from room temperature to temperatures above 100° C., for example about 130° C., but ordinarily I use temperatures within the range of 60° C. to 120° C. in causing polymerization.

These new varnishes may be used as impregnants for many porous bodies, such as cork, pottery, felts, or fabricated bodies with interstices, such as netted fibers, interwoven fibrous materials, etc. They also may be used for protectively coating impervious articles such as metals other than copper such, for example, iron, zinc, etc., or for coating or coating and impregnating articles such as paper, wood, cloth, glass fibers in felted, woven or other form, concrete, linoleum, synthetic boards, etc. These new varnishes also may be used in making laminated fibrous sheet materials wherein superposed layers of cloth, paper, etc., are firmly bonded together with the synthetic body.

In certain cases, instead of partially polymerizing a single diallyl ester of a saturated aliphatic or aryl dicarboxylic acid I may copolymerize a plurality of such esters to the partially polymerized state.

The new varnishes may be used alone or with fillers, dyes, pigments, opacifiers, lubricants, plasticizers or other modifying bodies.

What I claim as new and desire to secure by Letters Patent of the United States is:

1. A composition comprising (1) a partially polymerized diallyl ester of a dicarboxylic acid selected from the class consisting of saturated aliphatic acids and aryl dicarboxylic acids, and (2) an allyl ester having the structural formula:

$$CH_2=\overset{R}{\underset{|}{C}}-CH_2-O-\overset{O}{\underset{\|}{C}}-R'$$

wherein R is a member of the class consisting of hydrogen and the methyl radical and R' is an alkyl radical having at least one and not more than five carbon atoms.

2. A composition as in claim 1 wherein R' is the methyl radical.

3. A composition as in claim 1 wherein R is hydrogen and R' is the methyl radical.

4. A composition comprising (1) a partially polymerized diallyl ester of an aryl dicarboxylic acid and (2) an allyl ester having the structural formula:

$$CH_2=\overset{R}{\underset{|}{C}}-CH_2-O-\overset{O}{\underset{\|}{C}}-R'$$

wherein R is a member of the class consisting of hydrogen and the methyl radical and R' is an alkyl radical having at least one and not more than five carbon atoms.

5. A composition comprising allyl acetate and partially polymerized diallyl phthalate.

6. A composition comprising methallyl acetate and partially polymerized diallyl phthalate.

GAETANO F. D'ALELIO.